United States Patent [19]

Bannister

[11] Patent Number: 4,626,999
[45] Date of Patent: Dec. 2, 1986

[54] APPARATUS FOR CONTROLLED MANIPULATION OF LASER FOCUS POINT

[75] Inventor: Robert D. Bannister, Loveland, Ohio

[73] Assignee: Cincinnati Milacron Inc., Cincinnati, Ohio

[21] Appl. No.: 601,784

[22] Filed: Apr. 18, 1984

[51] Int. Cl.$^4$ .................. B23K 27/00; G06F 15/46
[52] U.S. Cl. .................... 364/474; 219/121 LG; 219/121 LU; 219/121 LY; 364/513; 901/42; 901/47
[58] Field of Search ............ 364/474, 475, 513; 901/41, 42, 47, 50; 219/121 L, 121 LA, 121 LB, 121 LU, 121 LV, 121 LX, 121 LY, 121 LZ, 121 LT, 121 LC, 121 LG; 414/730; 455/609, 610, 612

[56] References Cited

U.S. PATENT DOCUMENTS

| | | | |
|---|---|---|---|
| 3,736,402 | 5/1973 | Mefferd et al. | 901/41 X |
| 3,913,582 | 10/1975 | Sharon | 901/41 X |
| 4,335,296 | 6/1982 | Bredow | 219/121 LY X |
| 4,429,211 | 1/1984 | Carstens et al. | 219/121 LC |
| 4,532,400 | 7/1985 | Toida et al. | 219/121 LV X |
| 4,533,814 | 8/1985 | Ward | 901/42 X |

Primary Examiner—Joseph Ruggiero
Attorney, Agent, or Firm—John W. Gregg

[57] ABSTRACT

A machine for program controlled working a material with laser light is provided. The machine includes first movable members for effecting changes of position of a tool centerpoint associated with a function element carried by the machine. Second movable members effect changes in attitude of the function element through the tool centerpoint. A laser light beam is focused to a focus point by a focusing element supported by one of the second members. The laser light beam is conducted to the focusing element by an articulated light pathway from a laser light source. The articulated pathway comprises tubular segments connected at joints to redirect the laser light beam from one tubular segment to another. Each segment is mounted to the joint so as to be rotatable about the longitudinal axis of the segment. Adjustable stops are provided to limit the range of rotation of tubular segments as required.

6 Claims, 4 Drawing Figures

APPARATUS FOR CONTROLLED MANIPULATION OF LASER FOCUS POINT

BACKGROUND OF THE INVENTION

This invention relates generally to equipment for material working using laser light. In particular, this invention relates to apparatus for program controlled manipulation of the focus point of a laser light beam.

Material cutting, bonding and treating with laser light has been known for some time. Laser light, is particularly well suited to precision work, high speed trimming and work where high rates of tool wear have a significantly adverse affect on manufacturing cost. Heretofore, use of laser light beams in manufacturing operations has been achieved primarily by moving the workpiece relative to the focus point of the laser light beam. This arrangement suffers from the disadvantages of requiring precise motion control of workpieces of all sizes, shapes and masses, leading to unique machine configurations dictated by workpiece design. In known equipment where automated control of optical pathways for guidance of a laser light beam have been provided, the pathway has been designed for a particular requirement and, again, a unique machine configuration has resulted.

It is therefore one object of the present invention to provide a general purpose apparatus for program controlled manipulation of the focus point of a laser light beam.

It is a further object of the present invention to provide an apparatus for controlled manipulation of a focus point of a laser light beam having control over the position of the focus point and the direction of the beam therethrough.

It is a still further object of the present invention to provide an apparatus for program controlled manipulation of a focus point of a laser light beam suitable for use with laser light sources carried by the apparatus.

SUMMARY OF THE INVENTION

An apparatus is provided for program controlled manipulation of the focus point of a laser light beam. The apparatus includes a machine having first movable members for effecting changes of position of a tool centerpoint of a function element carried by the machine and second movable members for effecting changes of orientation of the function element through the tool centerpoint. The function element in this case, a focusing element at the outlet end of an articulated light pathway, is mounted to a second machine member. In the preferred embodiment, a laser light source connected to the inlet end of the light pathway is mounted upon a first movable member of the machine.

DESCRIPTION OF THE PREFERRED EMBODIMENT

The invention shall be further illustrated by description of the preferred embodiment wherein the manipulators and controls therefore are those available from Cincinnati Milacron Industries, Inc., assignee of the present invention. It is not intended that the present invention be in any way limited as to its scope, as a consequence of the detailed description of the preferred embodiment.

Figure 1:
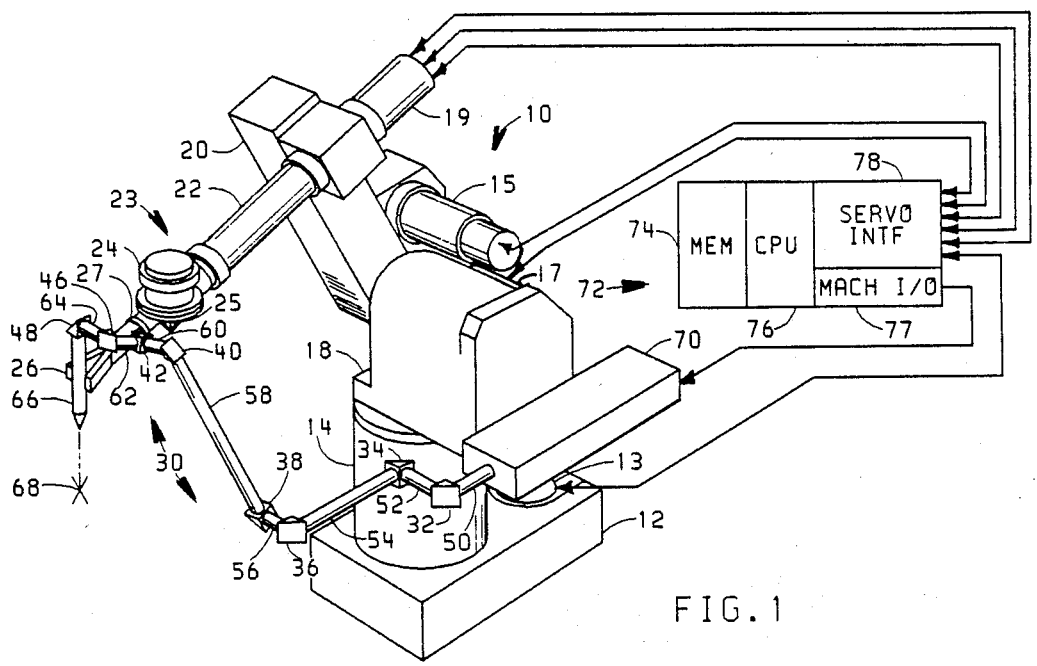
FIG. 1 shows an embodiment of the present invention wherein a laser light source is mounted on a shoulder member of a manipulator.

Referring to FIG. 1, a first alternative embodiment is shown including: a manipulator 10; a laser light source 70, mounted to the manipulator; an articulated light pathway 30 for guiding the laser light beam from the laser light source 70 to the outlet end 66 at gripper 26; and the manipulator control 72. Further details of the arrangement of the members of manipulator 10 are shown in U.S. Pat. No. Des. 268,033 issued Feb. 22, 1983 and assigned to the assignee of the present invention.

The manipulator controls the position of a focus point 68 and the direction of a laser light beam therethrough by controlling the position and attitude of the focusing element 66 held by the article grasping device 26. The manipulator provides rotation of the shoulder 18 about a vertical axis through the center of trunk 14. Trunk 14 is fixed to base 12 and rotation of shoulder 18 is provided by drive motor 13 by means of a drive train through base 12 and trunk 14. Upper arm 20 pivots about a horizontal axis through shoulder 18 and is driven by drive motor 17 mounted at the rear of shoulder 18. Forearm 22 pivots about upper arm 20 at a horizontal axis through the center of the adjacent surfaces of these arm members. Motion of forearm 22 is effected by drive motor 15 through a drive train contained within upper arm 20. Movement of the shoulder and arm members is sufficient to effect changes of position of focus point 68 anywhere within the range of motion of manipulator 10. Attitude of the article grasping device 26 is controlled by wrist 23 including inner segment 24 and outer segment 25. Inner segment 24 rotates about an axis on the longitudinal center-line of forearm 22. Outer segment 25 rotates about an axis oblique to the axis of rotation of inner segment 24. Face-plate 27, to which the article grasping device 26 is mounted, provides the final axis of rotation about an axis perpendicular to face-plate 27 and along the centerline of the article grasping device 26. This axis intersects the axis of rotation of outer segment 25 at the point of intersection of that axis with the axis of rotation of inner segment 24. The combination of the three axes of rotation at wrist 23 are illustrated in greater detail in U.S. Pat. No. 4,068,536 issued Jan. 17, 1978 and assigned to the assignee of the present invention. Drive motors for the three axes of rotation of wrist 23 are provided within housing 19. Rotation of the wrist members about these three axes of rotation are sufficient to control the orientation of the laser light beam through the focus point 68. This orientation may be defined by angles of pitch, yaw and roll. Where the focus point is not on the final axis of rotation (roll), the distance along the roll axis to the point of intersection therewith of a perpendicular offset to the focus point 68 and the length of the perpendicular offset, must be known to achieve the desired control of all movable members.

The drive motors 13 through 19 are controlled by servo mechanism interface circuits 78 within control 72.

Each axis of rotation has associated therewith a position measuring device for producing signals representing the current angular position of the movable member. Servo mechanism interface circuits 78 compare the current position signals against command signals produced in response to the stored program to produce control signals for motors 13 through 19.

Control of the manipulator drive motors to effect program controlled motion of the laser light focus point 68 and to control the direction of the laser light beam through focus point 68 is accomplished in response to a program specifying end point coordinates of linear paths, the velocity along said paths of the focus point, and the orientation angles at the end points. Signals representing these data are stored in memory 74 of control 72 and are processed by central processing unit 76 to effect coordinated control of the drive motors of all of the manipulator members so as to produce motion of the focus point 68 along the paths at the programmed velocity. Details of the method of control are set forth in U.S. Pat. No. 3,909,600 issued Sept. 30, 1975 and assigned to the assignee of the present invention. In addition to controlling the motion and attitude in accordance with the stored program, the control provides for the execution of functions at programmed locations. Thus, control over the laser light source 70 may be effected so as to control the generation of the laser light beam. This function control is effected through the machine input/output interface 77 in response to further signals stored in memory 74. A detailed description of a method and apparatus for creating the program stored in memory 74 is described in U.S. Pat. No. 3,920,972 issued Nov. 18, 1975 and assigned to the assignee of the present invention.

To maximize the range of motion of the laser light beam focus point 68, laser light source 70 is rigidly affixed to shoulder 18. The laser light beam produced by source 70 is conducted to a beam focusing element 66 by an articulated light pathway 30. Source 70 may be any of the commercially available sources and no restrictions is implied as to the laser medium or construction of the source 70 hereby.

Figure 3:
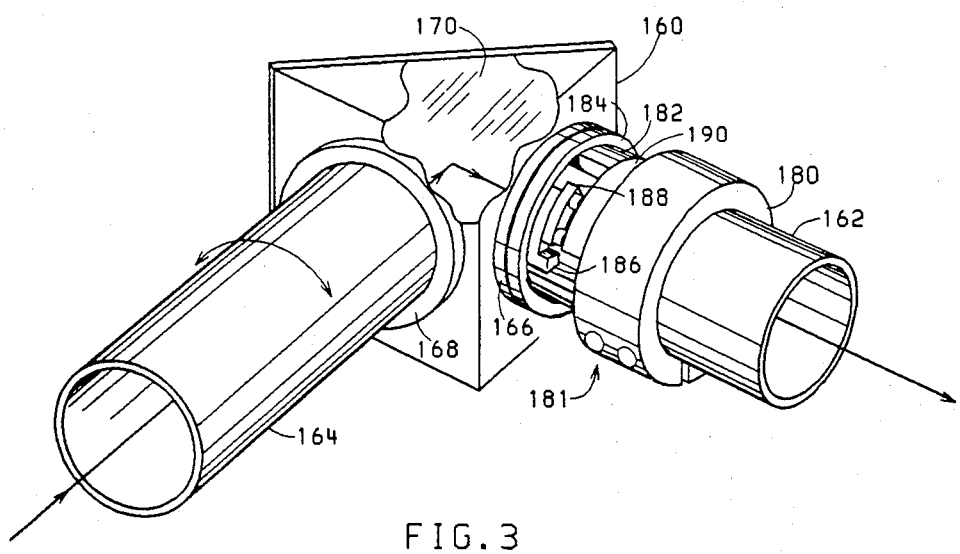
FIG. 3 shows a joint for joining segments of an articulated light pathway of the type used in the invention.

The articulated pathway comprises tubular segments 50 through 64 and right angle joints 32 through 48. Construction of the joints is as shown in FIG. 3 which will be described in detail hereinafter. Each joint permits rotation of the entering tubular segments about their longitudinal axes. The laser light beam enters the articulated pathway 30 at segment 50 and is aligned with the longitudinal axis of that segment. A mirror at each joint redirects the light beam so that it exits the joint along an axis perpendicular to the axis of the incoming beam. Rotation of the tubular segments provides considerable flexibility within the pathway.

Referring now to FIG. 3, the construction of a typical joint shall be described. Tubular segments 162 and 164 enter joint housing 160 at bearings 166 and 168 respectively. Bearings 166 and 168 permit full rotation through 360° of tubular segments 162 and 164 about their longitudinal axes. An adjustable stop 181 for limiting rotation is shown in place on tubular segment 162. This stop shall be described more fully hereinafter. As indicated by the arrow, the laser light beam enters along the axis of one of the tubular segments, is reflected by mirror 170 and exits through the second tubular segment. To accommodate the dissipation of energy at mirror 170, cooling means may be supplied to direct a heat exchanging fluid against the mirror substrate.

Figure 2:
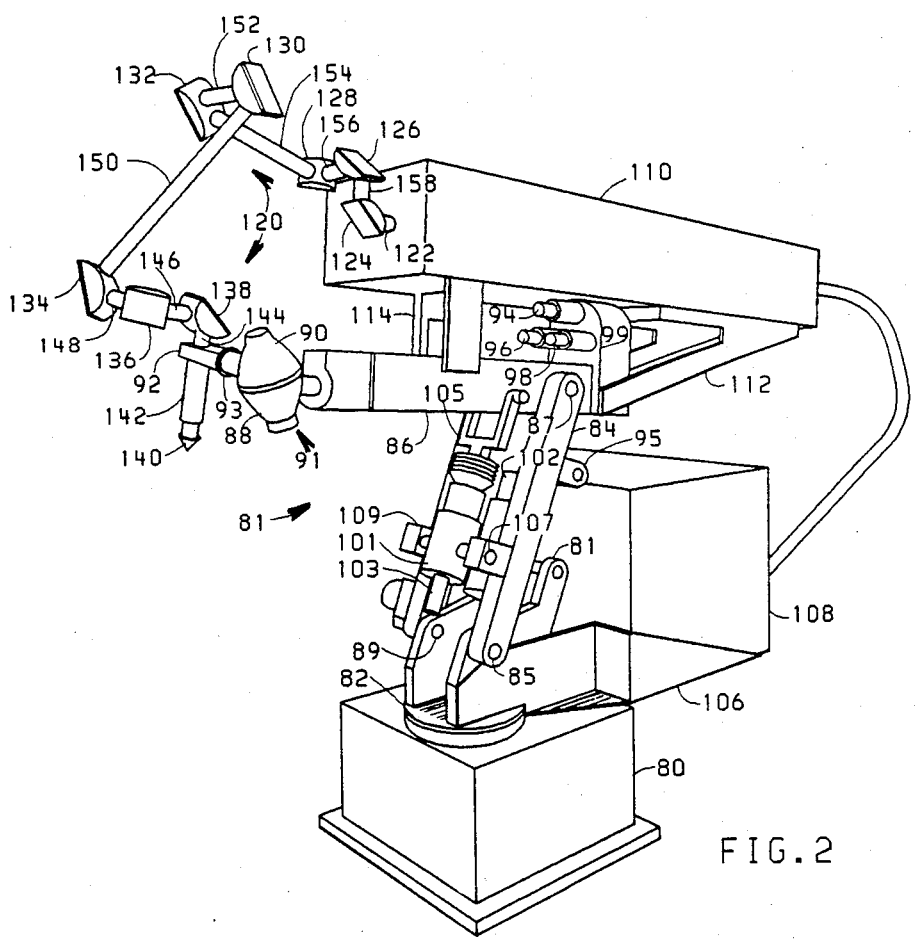
FIG. 2 shows a second embodiment of the present invention with the laser light source mounted on an arm member of a manipulator.

Referring now to FIG. 2, a second alternative embodiment of the present invention shall be described. The manipulator generally indicated as 81 comprises a shoulder 82 rotationally mounted on base 80. Drive means for imparting rotation to the shoulder are not shown but are located within base 80. Upperarm members 83 and 84 are pivotally mounted to shoulder 82 at pivot points 85 and 89 respectively. Rotation of members 83 and 84 about the horizontal axis through these pivot points is provided by drive motor 102 which imparts rotation to a nut to effect reciprocation of a screw not shown. The reciprocation of the screw reacts against a cross member through shoulder horn 81 and a second cross member through upperarm supports 95. A forearm 86 is pivotally mounted between upperarm members 83 and 84 to rotate about a horizontal axis through pivot point 87. Rotation of forearm 86 about this axis is imparted by a drive motor not shown effecting rotation of a nut 101 to reciprocate screw 103. Yoke 105 is directly connected to screw 103 and reaction against drive mounts 107 and 109 imparts rotation to forearm 86 about the horizontal axis through pivot point 87. A wrist 91 is mounted at the end of forearm 86 by its inner segment 88. Inner segment 88 rotates about the longitudinal axis passing through the center of forearm 86. Outer segment 90 of wrist 91 rotates about an axis oblique to the axis of rotation of inner segment 88 and passing through the extreme ends of the inner and outer segments. A final rotation at wrist 91 is provided to face-plate 93 about an axis passing through the center of face-plate 93 and perpendicular to its face. This axis intersects the oblique axis of rotation of outer segment 90 at the point of intersection of that oblique axis and the axis of rotation of inner segment 88. The drive for the axes of rotation of the wrist are provided by motors 94, 96 and 98 mounted to transmission housing 99 on forearm 86. Details of the construction of the manipulator 81 not shown herein are presented in U.S. Pat. No. Des. 269,681 issued July 12, 1983.

Continuing with reference to FIG. 2, a laser light source 110 is mounted to forearm 86 by brackets 114 and 112. A power supply 108 for laser light source 110 is carried by cradle 106 rigidly mounted to shoulder 82. An articulated light pathway 120 connects the exit 122 of laser light source 110 to the focusing element 142. Articulated pathway 120 comprises tubular segments 144 through 158 and joints 124 through 138. These joints and tubular segments are of the same general construction as described with reference to FIG. 3. Mounting device 92 which is attached to face-plate 93 accepts the final tubular segment 144 and provides mounting for focusing element 142. Affixed to focusing element 142 is a nozzle 140. The manipulator of FIG. 2 is operated by a control responsive to a stored program in the same manner as the manipulator of FIG. 1, although the control for manipulator 81 is not shown in FIG. 2. The alternative mounting of laser light source 110 on forearm 86 reduces the relative path length from the laser light source to the focusing element 142. Additional dexterity at the focusing element 142 is achieved by virtue of the arrangement of the articulated pathway principally along the longitudinal axis of the forearm. In all other respects, control over the position and motion of the laser light beam focus point and the orientation of the beam therethrough is as described with reference to the apparatus of FIG. 1.

While the articulated light pathways as shown and described with reference to FIGS. 1 and 2, provide a great deal of freedom of movement of the focusing elements, it is recognized that the motion of the manipulator members may result in configurations of the pathway segments from which continued motion can produce forces destructive to the pathways. In particular, without restraint on the range of motion of tubular segments about the joints, configurations of the pathway may be achieved in which forces are directed along the length of a tubular segment, which could result in bending forces against the other tubular segment entering the same joint. Applicant provides adjustable stops to limit the range of rotation of tubular segments as required for the range of motions encountered within a particular program.

Figure 4:
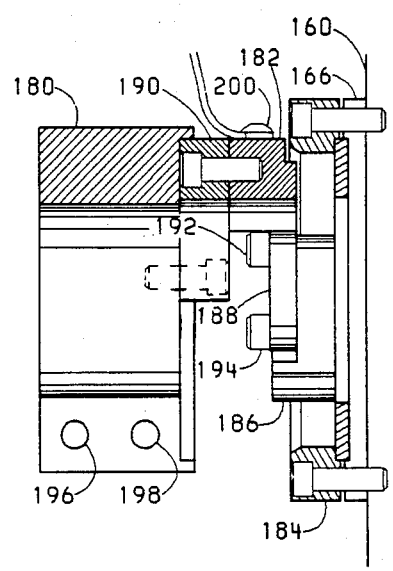
FIG. 4 shows a cross section of an adjustable stop device used to limit rotation of segments of the articulated light pathway.

Referring now to FIGS. 3 and 4, the adjustable stop device shall be described. A split ring collar 180 is mounted to a tubular segment such as segment 162 and clamped thereon by means of clamping screws 196 and 198. Affixed to collar 180 is an insulating spacer 190 to which is mounted stop 182. A stop ring 186 is clamped in place against a stationary surface such as the face of bearing 166 by means of a clamp ring 184 which is bolted to the joint housing 160 through bearing face 166. An adjustable finger 188 is mounted to stop ring 186 by bolts 192 and 194 through slots (not shown) in finger 188. As tubular segment 162 rotates about its longitudinal axis, the stop 182 will be brought into contact with the projection of stop ring 186 or the projecting end of adjustable stop 188. Thus, the range of rotation of tubular segment 162 is limited in accordance with the arc length established by the placement of the adjustable finger 188 on stop ring 186.

It is seen that both the arc length eliminated from rotation of a tubular segment and the relative position of the eliminated arc length are made adjustable by the adjustable stop device. The positioning of the stop ring relative to the range of rotation of the tubular segment is easily changed by loosening the clamping ring 184 and rotating the stop ring 186 under clamp ring 184. Clamping collar 180 is tightened on a tubular segment with sufficient force to prevent slipping of collar 180 relative to the tubular segment.

Applicant provides for detection of contact between stop 182 and adjustable finger 188 or stop ring 186 by means of an electrical contact being sensed through a connection 200 to stop 182. A signal carried from the connection 200 to the machine input/output interface 77 of the control 72 may be used within the control to evoke any of a variety of optional responses. Examples of responses include suspension of all motion of the manipulator until manually overridden by an operator command, or discontinuation of automatic execution of the program cycle of operation, or deenergization of manipulator member drive motors, or, if no automatic action is required, a warning signal or message for the operator's attention may be produced.

By virtue of the manipulator's program controlled operation, the focus point of the laser light beam is readily manipulated to permit working the material of a workpiece without requiring that a machine for manipulating the workpiece be provided. Manipulation of the focus point is constrained only by the range of motion of the manipulator and the flexibility of the articulated light pathway. Because of the attitude control effected by rotations at the wrist, that is, the ability to control pitch, yaw, and roll at the wrist, no special equipment is required to produce any desired focusing element attitude.

It will be appreciated that while the preferred embodiments illustrate mounting the laser light source on a movable member of the manipulator, in some instances it may be preferable to mount the laser light source fixedly relative to the machine base. In such instances the articulated light pathway may be provided with telescoping segments to accommodate relative motion between the laser light source and the machine. In such cases, the laser light pathway would include joints as illustrated as well as telescoping segments to achieve manipulation of the laser light beam at any desired attitude anywhere within the range of motion of the machine. It will further be appreciated, that while the preferred embodiments illustrate machines having only axes of rotation, that is, all machine members rotate about axes of rotation, program controlled positioning of the laser light focus point can be accomplished equally as well by members moving rectilinearly. Attitude of the laser light beam through the focus point would, nevertheless, be achieved by controlled rotations of the outlet end of the articulated light pathway. These rotations may be provided equally as well by pivoting members as by the wrist constructions shown and described in the preferred embodiments.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents following within the spirit and scope of the appended claims.

What is claimed is:

1. Apparatus for program controlled working of a material by manipulation of a focus point of a laser light beam, the focus point manipulation being effected in response to a stored program defining the motion of the focus point and the direction of the laser light beam through the focus point, the apparatus comprising:
   a. a laser generator for producing a laser light beam;
   b. a focusing element for focusing the laser light beam to a focus point;
   c. a program controlled machine having a plurality of first members relatively movable for three dimensionally moving the focus point of the focusing element to programmed locations and having a plurality of second members relatively movable for controlling the direction of the focusing element to direct the laser light beam through the focus point at the programmed location; and
   d. an articulated light pathway having an inlet end connected to the laser generator and an outlet end connected to the focusing element.

2. The apparatus of claim 1 wherein the first movable members include at least one member rotatable about a pivot point.

3. The apparatus of claim 2 wherein the laser light source is mounted to a first movable member.

4. The apparatus of claim 1 wherein the articulated pathway further comprises:
   (a) a plurality of tubular segments through which a laser light beam is conducted along the longitudinal axis thereof;
   (b) a plurality of joints for directing the laser light beam from one tubular segment to another, the tubular segments being rotatably fitted to said joints to permit rotation of the tubular segments about their longitudinal axes; and (c) an adjustable stop for limiting the range of rotation of a tubular segment at a joint.

5. The apparatus of claim 4 wherein the adjustable stop further comprises:
   (a) means for adjusting the arc length of the limited range of rotation of the tubular segment; and
   (b) means for adjusting the angular location of the delimited arc length.

6. The apparatus of claim 5 wherein the adjustable stop further comprises contact means for producing a signal indicating rotation of the tubular segment to an extreme of its limited range of rotation.

* * * * *